(12) United States Patent
Hsu et al.

(10) Patent No.: US 8,576,333 B2
(45) Date of Patent: Nov. 5, 2013

(54) PHOTOGRAPHIC DEVICE HAVING LIGHT-BLOCKING FILM

(75) Inventors: Chih Hui Hsu, New Taipei (TW); Min Wei Chen, Taipei (TW)

(73) Assignee: Vivotek Inc., New Taipei (TW)

( * ) Notice: Subject to any disclaimer, the term of this patent is extended or adjusted under 35 U.S.C. 154(b) by 14 days.

(21) Appl. No.: 13/259,068

(22) PCT Filed: Oct. 30, 2009

(86) PCT No.: PCT/CN2009/001209
§ 371 (c)(1),
(2), (4) Date: Sep. 22, 2011

(87) PCT Pub. No.: WO2011/050497
PCT Pub. Date: May 5, 2011

(65) Prior Publication Data
US 2012/0092549 A1      Apr. 19, 2012

(51) Int. Cl.
*H04N 5/225* (2006.01)
*H04N 5/222* (2006.01)
(52) U.S. Cl.
USPC ........... 348/374; 348/370; 348/371; 348/373; 348/375; 348/376
(58) Field of Classification Search
USPC ........................... 348/373, 216, 371, 374, 375
See application file for complete search history.

(56) References Cited

U.S. PATENT DOCUMENTS

| 5,701,015 A | * | 12/1997 | Lungershausen et al. | . 250/495.1 |
| 7,373,082 B2 | * | 5/2008 | Yamazaki et al. | ............. 396/72 |
| 7,880,796 B2 | * | 2/2011 | Yamaguchi et al. | .......... 348/335 |
| 8,031,412 B2 | * | 10/2011 | Shintani | ....................... 359/738 |

FOREIGN PATENT DOCUMENTS

| CN | 1661465 A | 8/2005 |
| TW | I246626 B1 | 1/2006 |
| TW | M294796 | 7/2006 |

* cited by examiner

*Primary Examiner* — James M Hannett
*Assistant Examiner* — Padma Haliyur
(74) *Attorney, Agent, or Firm* — Morris Manning & Martin LLP; Tim Tingkang Xia, Esq.

(57) ABSTRACT

A photographic device includes a body, and at least an optical assembly and multiple auxiliary light sources surrounding the optical assembly are disposed in the body. A front cover is disposed on a front end of the body, and a protecting mirror is disposed on the front cover. Light emitted by the auxiliary light sources passes through the protecting mirror and illuminates a photographic area. A light-blocking film is disposed on the protecting mirror corresponding to the optical assembly, so as to prevent the light emitted by the auxiliary light sources from entering the optical assembly after reflected by the protecting mirror.

7 Claims, 8 Drawing Sheets

PHOTOGRAPHIC DEVICE HAVING LIGHT-BLOCKING FILM

BACKGROUND

1. Technical Field

The present disclosure relates to a photographic device, and more particularly to a photographic device having auxiliary light sources.

2. Related Art

Through monitoring photographic technology, motions in the monitored environment may be photographed and recorded, and such photographic technology may effectively replace conventional security personnel. The monitoring photographing may combine an optical recognition technology with an alarm system so that an alarm signal is emitted when an abnormal condition occurs in the monitored environment, which has become a main passive security mechanism at present.

The majority of apparatuses employing the monitoring photographic technology are monitoring cameras which may be sorted into an indoor type and an outdoor type according to the environment where the monitoring camera is set. In addition to a required waterproof and dustproof function since the outdoor-type monitoring camera is disposed outdoors, the outdoor-type monitoring camera is further required to have a night vision function since 24-hour photographing is required outdoors. At present, the outdoor-type monitoring camera uses an infrared light source as an auxiliary light source during photographing at night.

The outdoor-type monitoring camera including a body, and electronic parts such as a lens and an image sensor are used for taking a photograph and infrared Light Emitting Diodes (LED) surrounding the lens are disposed in the body. A front cover is combined on a front end of the body, and transparent glass is disposed on the front cover, so that external light passes through the transparent glass and enters the lens, or light emitted by the infrared LED passes through the transparent glass and illuminates a photographic area. When the light emitted by the infrared LED passes through the transparent glass, the light is theoretically refracted merely since the transparent glass and the air are different media. However, in fact, partial light is reflected on a top surface or a bottom surface of the transparent glass since the top surface and the bottom surface of the transparent glass both are smooth surfaces. The reflected light may enter the lens, and cause the halo phenomenon or the ghost image phenomenon on the formed image, so that the image is blurred or unrecognizable.

In order to avoid the halo phenomenon or the ghost image phenomenon due to the illumination of the infrared light source on the transparent glass, in the prior art, a circular hole is cut at a position on the transparent glass corresponding to the lens, and a shielding component is disposed at the circular hole, in which the shielding component is cylinder-shaped. One end of the shielding component assembled at the circular hole of the transparent glass and the other end sleeved on the lens, so that the shielding component is located between the infrared LED and the lens (referring to Taiwan Patent Publication No. M294796). Since the shielding component protrudes from the transparent glass and is sleeved on the lens, even if the light generated by the infrared light source is reflected when passing through the smooth top surface or the smooth bottom surface of the transparent glass, the reflected light cannot enter the lens, thereby effectively preventing the halo phenomenon or the ghost image phenomenon.

However, in order to enable the outdoor-type monitoring camera to be waterproof and dustproof (for example, the highest level IP68 in International Industrial Waterproof Standard), the junction of the combination components such as the body, the front cover and the transparent glass disposed on the front cover is required to be sealed by waterproof materials such as a sealing ring. In addition, in order to prevent the reflected light of the infrared light source from entering the lens, the shielding component needs to include multiple parts and the transparent glass of the front cover needs to be cut and to be remanufactured, and in order to be waterproof and dustproof, the shielding component needs to be further disposed by waterproof materials such as a sealing ring. Hence, not only the cost is increased, but also the waterproof and dustproof effect is not desirable due to the additional multiple parts and complex remanufacturing and assembling procedures of making the waterproof and dustproof monitoring camera.

SUMMARY

The photographic device according to the disclosure comprises a body, an optical assembly, a light-shielding sleeve and several auxiliary light sources. The optical assembly is disposed in the body, the auxiliary light sources surround the optical assembly, and the light-shielding sleeve is sleeved between a lens of the optical assembly and the auxiliary light sources. A front cover is disposed on a front end of the body, and a protecting mirror is disposed on the front cover. A light-blocking film is disposed on the protecting mirror corresponding to several critical lines of a photographic angle of the optical assembly, so as to prevent light emitted by the auxiliary light sources from entering the lens of the optical assembly after being reflected by the protecting mirror.

The photographic device according to the disclosure, since the light-shielding sleeve is sleeved between the lens of the optical assembly and the auxiliary light sources, and the light-blocking film is disposed on the protecting mirror corresponding to the critical lines of the photographic angle of the optical assembly, the light emitted by the auxiliary light sources is effectively prevented from entering the lens after being reflected by the protecting mirror. In addition, the light-blocking film may be disposed on the protecting mirror by a coating process, and it is unnecessary to perform a cutting or other reprocessing procedures on the protecting mirror so that the integrity of the protecting mirror can be maintained to ensure the waterproof and dustproof effect provided by the protecting mirror. Hence, the technical conflict between the image quality required by photographing and the waterproof and dustproof requirements is solved.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

A photographic device according to an embodiment of the disclosure refers to an image capturing device such as a Digital Internet Protocol Camera, a Closed Circuit Television (CCTV), a Web Camera, a Video Camera, or a still Camera. The photographic device includes an auxiliary light source which is an infrared LED for emitting infrared light, so as to enable the photographic device to photograph in a dark environment (for example, at night). In the following embodiments, an outdoor-type monitoring camera disposed outdoors is used as embodiments.

Figure 1:
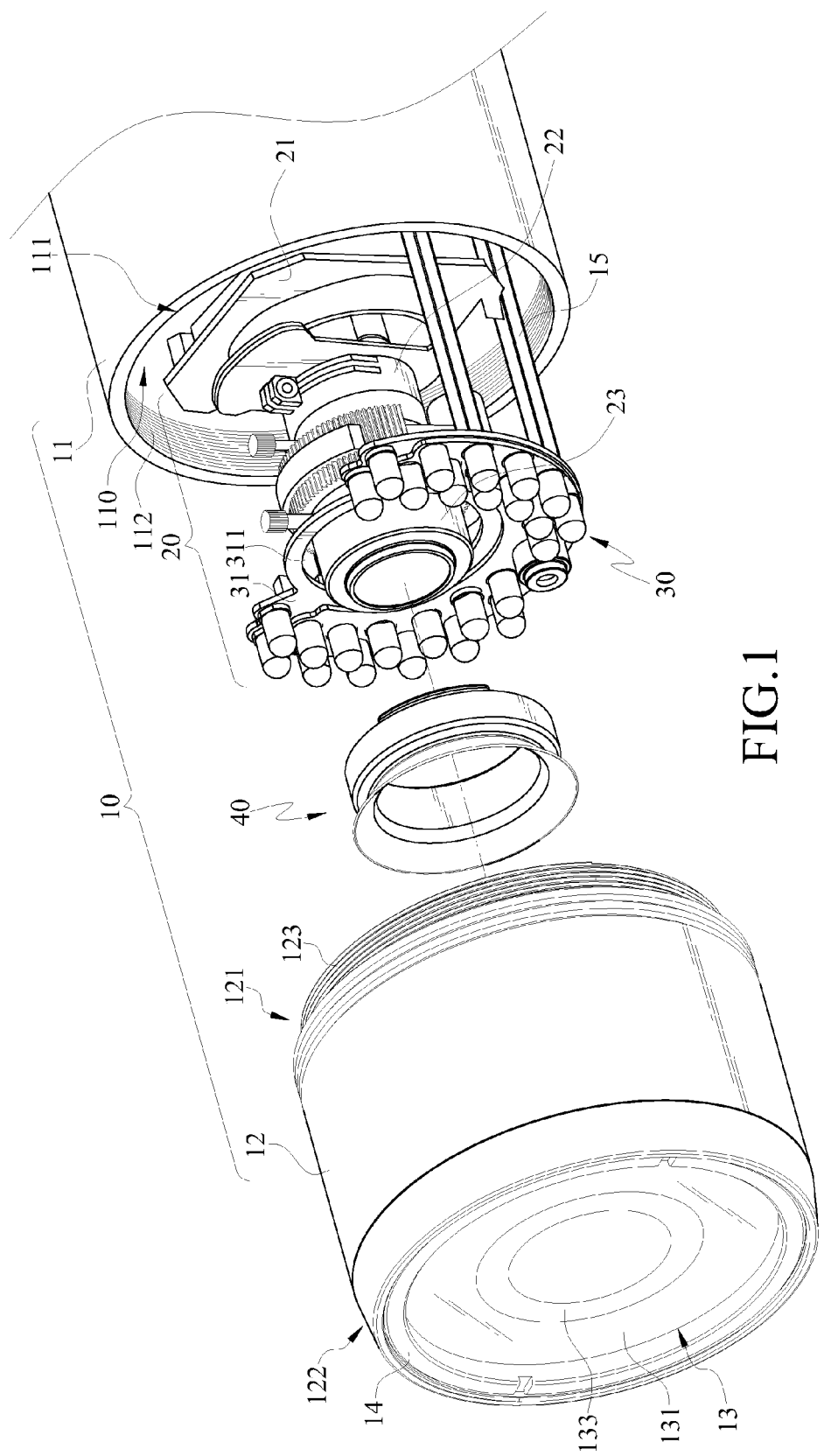
FIG. 1 is a schematic exploded view of a photographic device according to an embodiment of the disclosure.
Figure 2:
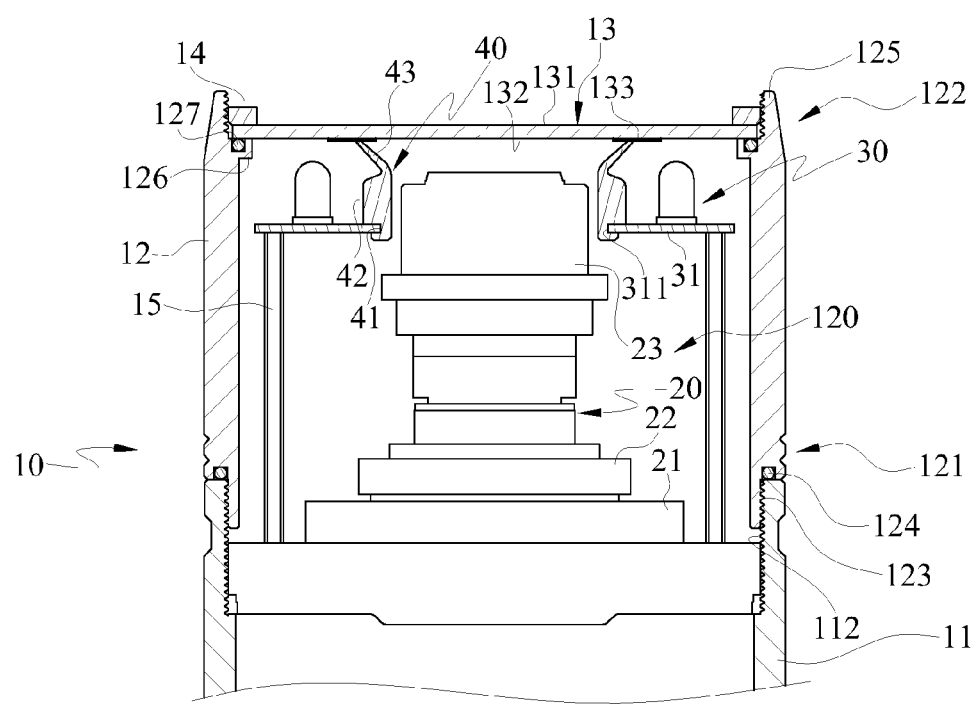
FIG. 2 is a schematic sectional view of the photographic device according to an embodiment of the disclosure.

FIG. 1 is a schematic exploded view of a structural composition according to an embodiment of the disclosure. FIG. 2 is a schematic sectional view of the structural composition according to an embodiment of the disclosure. Referring to FIGS. 1 and 2, the photographic device comprises a body 10, an optical assembly 20, several auxiliary light sources 30 and a light-shielding sleeve 40.

The body 10 is in a hollow cylindrical shape and has a room 110 formed therein, and the optical assembly 20 and other electronic parts (not shown) used for photographing or recording are disposed inside the room 110. The body 10 comprises a housing 11 and a front cover 12, the housing 11 has an opening end 111 corresponding to the room 110 and an inner side surface of the opening end 111 having an inner thread 112. The front cover 12 matches the housing 11 and can be combined with the housing 11, and the front cover 12 is also in a hollow cylindrical shape and has a room 120. The front cover 12 has a combination end 121 corresponding to the opening end 111 and a protecting-mirror end 122 opposite to the combination end 121. The combination end 121 has an outer thread 123, a sealing ring 124 is disposed near the outer thread 123, and the outer thread 123 of the front cover 12 is screwed to the inner thread 112 of the housing 11, so that the front cover is combined with the housing 11, and a waterproof effect is achieved by the sealing ring 124. Moreover, an inner side surface of the protecting-mirror end 122 of the front cover 12 has an inner thread 125, a bearing surface 126 is disposed near the inner thread 125, and a sealing ring 127 is disposed on the bearing surface 126. A protecting mirror 13 is disposed on the bearing surface 126. The protecting mirror 13 having a top surface 131 and a bottom surface 132 is planar transparent glass for light penetration. A pressing ring 14 is screwed to the inner thread 125 of the protecting-mirror end 122, so that the protecting mirror 13 is combined with the protecting-mirror end 122, and the waterproof effect is achieved by the sealing ring 127.

The optical assembly 20 disposed in the room 110 of the body 10 and the room 120 of the front cover 12 comprises a main circuit board 21, an image sensor 22 (such as a Charge Coupled Device, CCD or a Complementary Metal-Oxide Semiconductor, CMOS) and a lens 23. External light passes through the protecting mirror 13 and enters the lens 23, so that the light is sensed and imaged on the image sensor 22, and the captured image is remotely transmitted and stored by a signal transmission element or a storage medium (not shown).

Several supports 15 are disposed in the body 10, a secondary circuit board 31 is set on the multiple supports 15 corresponding to the lens 23, the secondary circuit board 31 has a through hole 311 corresponding to the lens 23, the lens 23 passes through the through hole 311, and the several auxiliary light sources 30 are disposed on the secondary circuit board 31. The auxiliary light sources 30 are infrared LED, and can emit invisible infrared light. In a dark environment (for example, at night), the infrared light emitted by the auxiliary light sources 30 passes through the protecting mirror 13 and illuminates a photographic area, and then is reflected into the lens 23 to be sensed and imaged by the image sensor 22. In this case, the infrared light is imaged into a black-and-white image, which is different from a bright environment (for example, in a daytime). Basically, the auxiliary light sources 30 are evenly distributed on and surround the lens 23. In addition, due to a configuration of the optical assembly 20 or other electronic parts in the body 10, the auxiliary light sources 30 may also be irregularly arranged.

The light-shielding sleeve 40 is made of a rubber material, and thus is flexible and lightproof. The light-shielding sleeve 40 is in a hollow cylindrical shape, and has a combination portion 41, a cylinder portion 42 and a conical portion 43. The light-shielding sleeve 40 is sleeved on the lens 23, so that the combination portion 41 is mounted to the through hole 311 of the secondary circuit board 31, and the cylinder portion 42 and the conical portion 43 are located between the several auxiliary light sources 30 and the lens 23, so as to prevent the infrared light emitted by the auxiliary light sources 30 from directly entering the lens 23 to affect the imaging. The conical portion 43 is inclined at an angle to match the photographic angle of the lens 23. The front cover 12 is combined with the housing 11, and an edge of the conical portion 43 of the light-shielding sleeve 40 is just connected to the protecting mirror 13.

Figure 3:
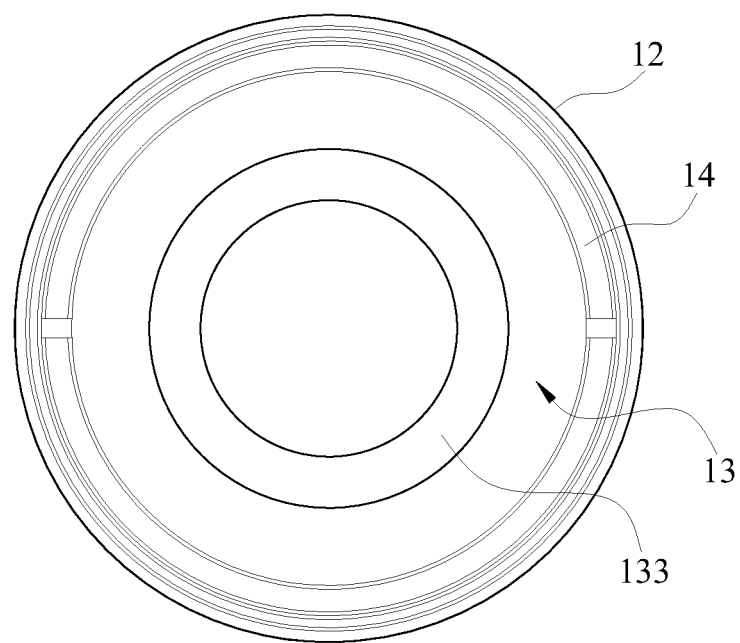
FIG. 3 is a schematic top view of a front cover according to an embodiment of the disclosure.

FIG. 3 is a schematic top view of a front cover according to an embodiment of the disclosure. Referring to FIGS. 1, 2 and 3, according to the photographic device according to an embodiment, the light-shielding sleeve 40 is disposed between the auxiliary light sources 30 and the lens 23, so as to prevent the infrared light emitted by the auxiliary light sources 30 from entering the lens 23 directly. Moreover, a light-blocking film 133 is further disposed on the bottom surface 132 of the protecting mirror 13. The light-blocking film 133 is ring-shaped to be relative to the lens 23, and the light-blocking film 133 is used for preventing the infrared light emitted by the auxiliary light sources 30 from entering the lens 23 after reflected by the protecting mirror 13. The way of fabricating the light-blocking film 133 may be directly coating the light-blocking film 133 on the bottom surface 132 of the protecting mirror 13 by screen printing, or first fabricating a ring-shaped sheet (film or Mylar), and then adhering the ring-shaped sheet to the bottom surface 132 of the protecting mirror 13.

Figure 4:
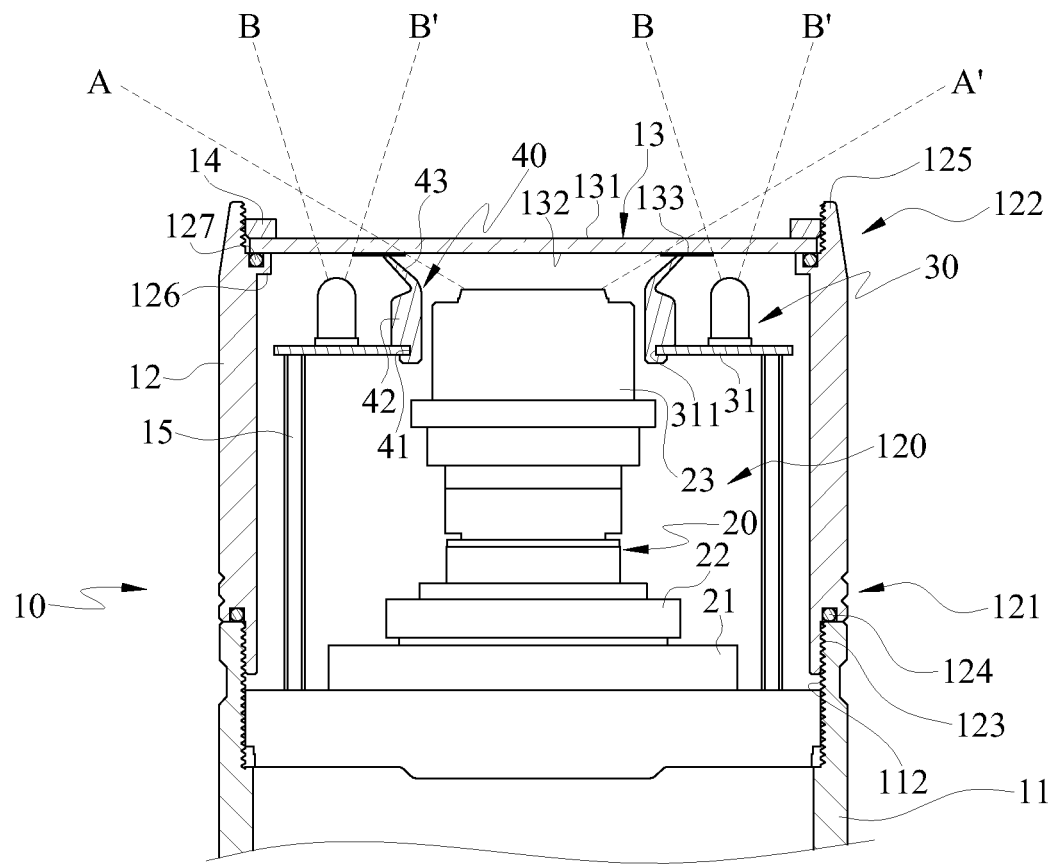
FIG. 4 is a schematic imaginary view of light in the photographic device according to an embodiment of the disclosure.
Figure 5:
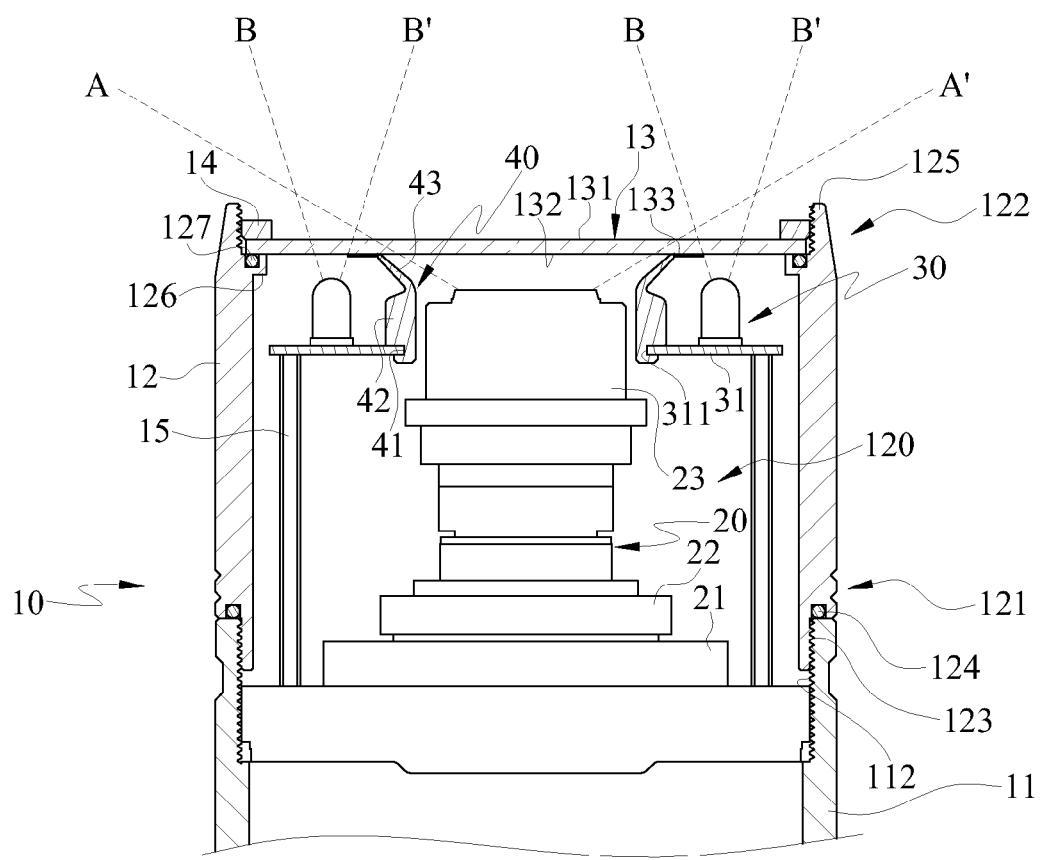
FIG. 5 is a schematic view of a light-blocking film according to another embodiment of the disclosure.

FIG. 4 is a schematic imaginary view of light in the structural composition according to an embodiment of the disclosure. Referring to FIG. 4, imaginary lines A and A' shown in FIG. 4 are critical lines of the photographic angle of the lens 23 (the angle of the photography varies as different lenses are used), and imaginary lines B and B' are critical lines of the illumination angle of the auxiliary light sources 30 (the angle of the illumination varies as different LED is used). An internal diameter of the light-blocking film 133 is adjacent to the imaginary lines A and A', and an outer edge of the light-blocking film 133 is adjacent to the imaginary lines B and B'. Therefore, when the infrared light of the auxiliary light sources 30 passes through the protecting mirror 13, even if the infrared light is reflected on the smooth top surface 131 or bottom surface 132 of the protecting mirror 13, the infrared light reflected by the protecting mirror 13 is blocked by the light-shielding sleeve 40 and the light-blocking film 133, thereby effectively preventing the infrared light emitted by the auxiliary light sources 30 from entering the lens 23. This is to say, the disposition of the light-shielding sleeve 40 and the light-blocking film 133 are used for preventing the infrared light emitted by the auxiliary light sources 30 from entering the lens 23 so as to provide the best image quality for photographing by the auxiliary light sources 30. Meanwhile, since the light-blocking film 133 may be disposed on the protecting mirror 13 by a coating process such as printing, or the sheet is fabricated and adhered onto the protecting mirror 13, it is unnecessary to perform cutting, assembling or other remanufacturing procedures on the protecting mirror 13, so that the integrity of the protecting mirror 13 can be maintained, thereby achieving the best waterproof and dustproof effect. Moreover, no matter whether the light-blocking film 133 is formed by screen printing or adhesion, the production cost could be dramatically reduced. The foregoing embodiment is defined according to the photographic angle of the lens 23 and the illumination angle of the auxiliary light sources 30. FIG. 5 is a schematic view of a light-blocking film according to another embodiment of the disclosure. As shown in FIG. 5, however, since the edge of the conical portion 43 of the light-shielding sleeve 40 is just connected to the bottom surface 132 of the protecting mirror 13, the internal diameter of the light-blocking film 133 may also be adjacent to the edge of the conical portion 43 of the light-shielding sleeve 40, and the outer edge of the light-blocking film 133 may cross the imaginary lines B and B'. Although a part of the infrared light is shielded, the crossing distance of the light-blocking film 133 may be controlled to adjust the illumination angle of the auxiliary light sources 30.

Figure 6:
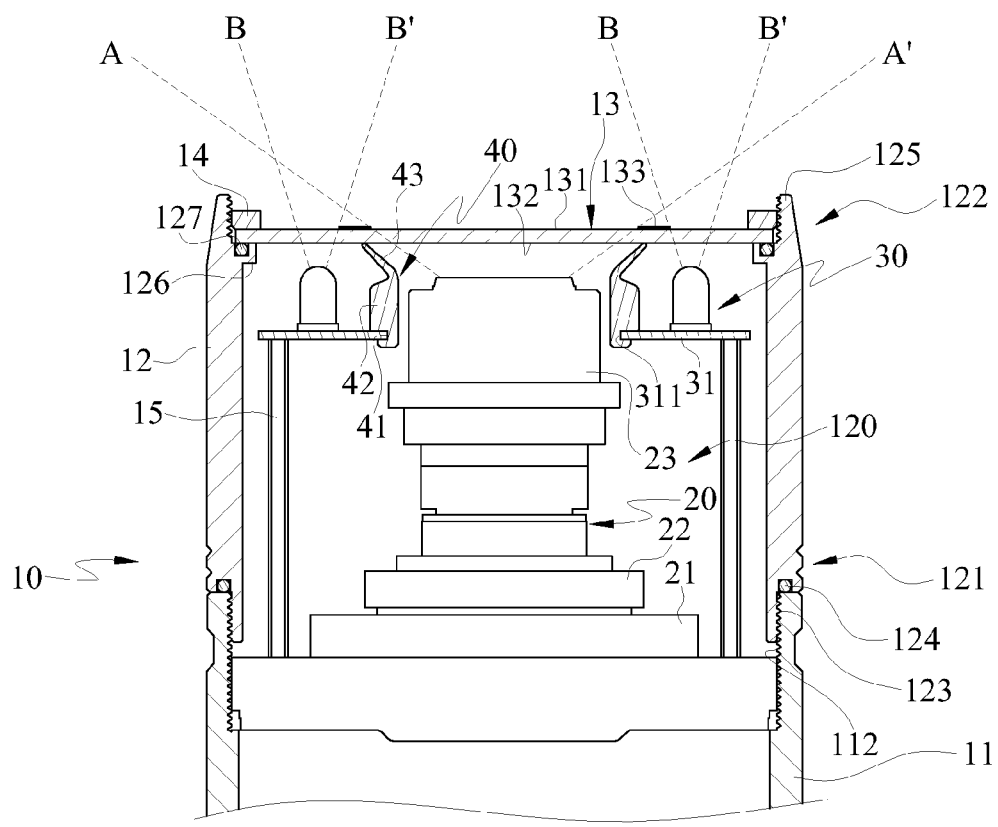
FIG. 6 is a schematic view of the light-blocking film according to still another embodiment of the disclosure.
Figure 7:
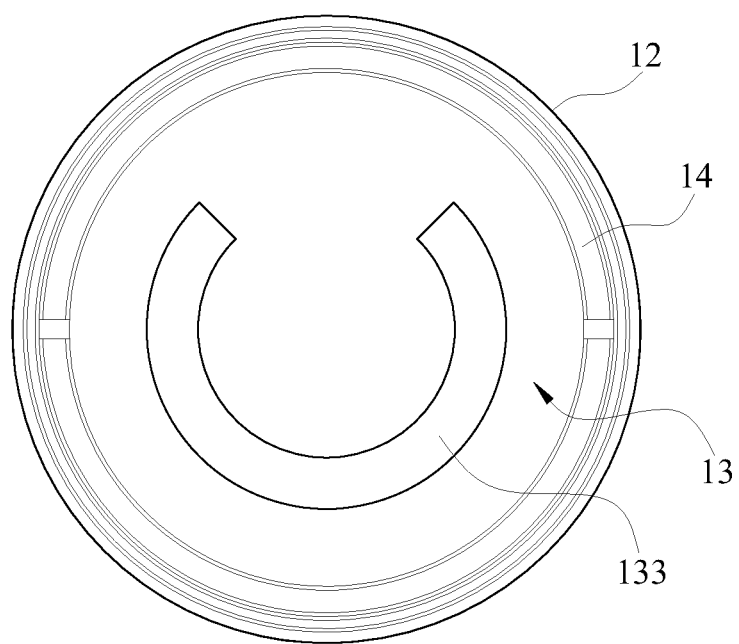
FIG. 7 is a schematic view of the light-blocking film according to yet another embodiment of the disclosure.

In the foregoing embodiment, the light-blocking film 133 is disposed on the bottom surface 132 of the protecting mirror 13. FIG. 6 is a schematic view of the light-blocking film according to still another embodiment of the disclosure. As shown in FIG. 6, however, the light-blocking film 133 may also be disposed on the top surface 131 of the protecting mirror 13, the internal diameter of the light-blocking film 133 is adjacent to the imaginary lines A and A', and the outer edge of the light-blocking film 133 is adjacent to the imaginary lines B and B', thereby effectively preventing the infrared light emitted by the auxiliary light sources 30 from entering the lens 23. In the foregoing embodiment, the light-blocking film 133 is in the shape of a ring. FIG. 7 is a schematic view of the light-blocking film according to yet another embodiment of the disclosure. As shown in FIGS. 6 and 7, due to the configuration of the optical assembly 20 or other electronic parts in the body 10, the auxiliary light sources 30 may also be irregularly arranged, and the shape of the light-blocking film 133 depends on the arrangement of the auxiliary light sources 30. For example, the light-blocking film 133 may be in a discontinuous ring shape or in an irregular shape with the outer edge matching the arrangement of the auxiliary light sources 30.

Figure 8:
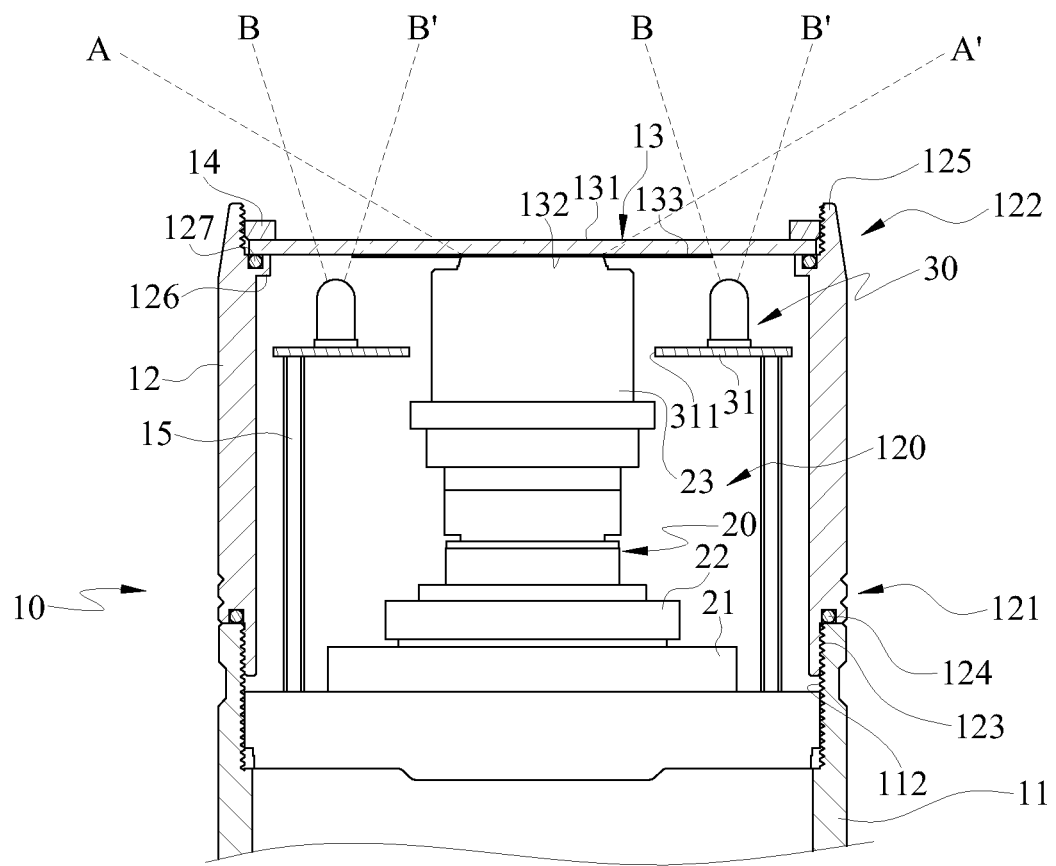
FIG. 8 is a schematic sectional view of the structural composition of other embodiment of the disclosure.

In the foregoing embodiment, since there exists a distance from the lens 23 to the protecting mirror 13, the light-shielding sleeve 40 is disposed between the auxiliary light sources 30 and the lens 23 and the disposition of the light-shielding sleeve 40 is to prevent the infrared light emitted by the auxiliary light sources 30 from directly entering the lens 23. FIG. 8 is a schematic sectional view of the structural composition of other embodiment of the disclosure. As shown in FIG. 8, however, the lens 23 may be disposed adjacent to the protecting mirror 13, so that the light-blocking film 133 is directly disposed between the imaginary lines A and A' and the imaginary lines B and B' to prevent the infrared light emitted by the auxiliary light sources 30 from entering the lens 23 directly.

What is claimed is:

1. A photographic device, comprising:
a body, comprising a housing and a front cover, wherein an optical assembly is disposed in the body and a plurality of auxiliary light sources surround the optical assembly, and wherein the optical assembly has a lens with a photographic angle, the multiple auxiliary light sources have an illumination angle, the front cover is combined to the housing, and a protecting mirror is disposed on the front cover;
a light-shielding sleeve, sleeved between the optical assembly and the multiple auxiliary light sources; and
a light-blocking film, disposed on the protecting mirror corresponding to a plurality of critical lines of the lens, wherein the plurality of critical lines of the lens is defined by the photographic angle of the lens, wherein the light-blocking film is ring-shaped, an internal diameter of the light-blocking film is adjacent to and outside the critical lines of the photographic angle of the lens, and an outer edge of the light-blocking film is adjacent to a plurality of critical lines of the illumination angle of the auxiliary light sources.

2. The photographic device according to claim 1, wherein the optical assembly comprises a main circuit board and an image sensor.

3. The photographic device according to claim 1, wherein the light-blocking film matches an arrangement manner of the auxiliary light sources and is discontinuous ring-shaped.

4. The photographic device according to claim 1, wherein an outer edge of the light-blocking film matches an arrangement manner of the auxiliary light sources and the shape of the outer edge of the light-blocking film is irregular.

5. The photographic device according to claim 1, wherein the light-blocking film is disposed on a bottom surface of the protecting mirror.

6. The photographic device according to claim 1, wherein the light-blocking film is disposed on a top surface of the protecting mirror.

7. A photographic device, comprising:
a body, comprising a housing and a front cover, wherein an optical assembly, a plurality of auxiliary light sources surrounding the optical assembly are disposed in the body, the front cover is combined to the housing, a protecting mirror is disposed on the front cover, the optical assembly has a lens, and the lens is adjacent to the protecting mirror; and
a light-blocking film, disposed on the protecting mirror corresponding to a plurality of critical lines of the lens, wherein the plurality of critical lines of the lens is defined by a photographic angle of the lens, wherein the light-blocking film is ring-shaped, an internal diameter of the light-blocking film is adjacent to and outside a plurality of critical lines of the lens, and an outer edge of the light-blocking film is adjacent to a plurality of critical lines of an illumination angle of the multiple auxiliary light sources.

* * * * *